US008366262B2

(12) United States Patent
Miyamoto et al.

(10) Patent No.: US 8,366,262 B2

(45) Date of Patent: Feb. 5, 2013

(54) SHEET FEEDER AND IMAGE FORMING APPARATUS INCLUDING SAME

(75) Inventors: Yoshio Miyamoto, Kawasaki (JP); Akito Yoshimaru, Yokohama (JP); Atsuo Tokunaga, Chigasaki (JP); Shigeru Morinaga, Sagamihara (JP)

(73) Assignee: Ricoh Company, Limited, Tokyo (JP)

( * ) Notice: Subject to any disclaimer, the term of this patent is extended or adjusted under 35 U.S.C. 154(b) by 241 days.

(21) Appl. No.: 12/880,500

(22) Filed: Sep. 13, 2010

(65) Prior Publication Data

US 2011/0063391 A1 Mar. 17, 2011

(30) Foreign Application Priority Data

Sep. 15, 2009 (JP) ................................ 2009-212895

(51) Int. Cl.

*B41J 2/01* (2006.01)
*B65H 23/00* (2006.01)
*G01D 15/20* (2006.01)
*G03G 15/00* (2006.01)

(52) U.S. Cl. ......... 347/104; 242/566; 346/105; 399/371

(58) Field of Classification Search ........................ None
See application file for complete search history.

(56) References Cited

FOREIGN PATENT DOCUMENTS

| | | |
|---|---|---|
| CN | 1269318 A | 11/2000 |
| CN | 1628064 A | 6/2005 |
| JP | 61-037653 A | 2/1986 |
| JP | 2003-81462 | 3/2003 |
| JP | 2005-343657 | 12/2005 |
| JP | 3935313 | 3/2007 |
| WO | WO 2009/066399 A1 | 5/2009 |

OTHER PUBLICATIONS

Chinese Office Action mailed Sep. 17, 2012 in Chinese Patent Application No. 2010-10286409.6.

*Primary Examiner* — Stephen Meier
*Assistant Examiner* — Alexander C Witkowski
(74) *Attorney, Agent, or Firm* — Oblon, Spivak, McClelland, Maier & Neustadt, L.L.P.

(57) ABSTRACT

A sheet feeder for transporting a sheet unreeled from a roll includes a feed roller to unreel the sheet from the roll, a registration roller to transport the sheet unreeled by the feed roller to the image forming unit, a pressure roller pressing against the registration roller, forming a registration nip together with the registration roller, a movable sheet guide to guide the sheet to the registration roller, disposed between the feed roller and the registration roller in a sheet conveyance path, a support member to movably support the movable sheet guide relative to an apparatus body in which the sheet feeder is disposed, and a bias member to bias the sheet guide toward the sheet. The movable sheet guide wraps more of the sheet around the registration roller as a degree of tension of the sheet increases by moving against a bias force exerted by the bias member.

8 Claims, 8 Drawing Sheets

SHEET FEEDER AND IMAGE FORMING APPARATUS INCLUDING SAME

CROSS-REFERENCE TO RELATED APPLICATIONS

This patent specification is based on and claims priority from Japanese Patent Application No. 2009-212895, filed on Sep. 15, 2009 in the Japan Patent Office, which is hereby incorporated by reference herein in its entirety.

BACKGROUND OF THE INVENTION

1. Field of the Invention

The present invention generally relates to a sheet feeder used in an image forming apparatus, such as a copier, a printer, a facsimile machine, or a multifunction machine including at least two of these functions, and an image forming apparatus including the sheet feeder.

2. Discussion of the Background Art

There are image forming apparatuses in which a long sheet unreeled from a paper roll by a feed roller is conveyed by a registration roller to an image forming unit at a predetermined timing. Such image forming apparatuses generally include a guide member disposed along a sheet conveyance path to guide the sheet so that the sheet does not go slack.

For example, JP-2005-343657-A discloses a sheet feeding mechanism that includes a guide plate movable relative to a main body of the image forming apparatus to prevent the sheet unreeled from the paper roll from becoming slack in the sheet conveyance path.

Recently, in response to demand for faster image formation speeds, it is preferred that the registration roller can start up immediately to send the sheet to the image formation unit quickly. By contrast, as the moment of inertia of the paper roll is relatively large, it is preferred that the feed roller is started up gradually considering torque margin. In other words, it is preferable that a registration motor for driving the registration roller should start up immediately, whereas a feed motor for driving the feed roller should start up gradually.

With this configuration, the rotational velocity at start-up differs between the registration roller and the feed roller if the two rollers are started simultaneously, and consequently the registration roller transports the sheet faster than the feed roller feeds the sheet out. As a result, the sheet is subjected to force in the reverse direction to the direction in which the sheet is transported, and a force that stretches the sheet backward (back tension) increases abruptly. As the back tension exerted on the paper roll increases, that is, the force pulling the sheet in the reverse direction increases, the sheet is more likely to slip on the registration roller. Slippage of the sheet on the registration roller can result in sheet conveyance failure. For example, the registration roller might fail to transport the sheet at the predetermined timing to the image forming unit.

Although capable of preventing slackage of the sheet in the sheet conveyance path to some extent, the above-described related-art sheet feeder does not address the slippage of the sheet on the registration roller.

In view of the foregoing, the inventors of the present invention recognize that there is a need for a sheet feeder capable of preventing both slippage of the sheet on the registration roller and slackage of the sheet, which known approaches fail to do.

SUMMARY OF THE INVENTION

In view of the foregoing, one illustrative embodiment of the present invention provides a sheet feeder for transporting a sheet unreeled from a roll to an image forming unit. The sheet feeder includes a feed roller to unreel the sheet from the roll, a registration roller to transport the sheet unreeled by the feed roller to the image forming unit, a pressure roller pressing against the registration roller, a movable sheet guide to guide the sheet to the registration roller, a support member to movably support the movable sheet guide relative to an apparatus body in which the sheet feeder is disposed, and a bias member to bias the sheet guide toward the sheet. The registration roller and the pressure roller together form a registration nip therebetween. The movable sheet guide is disposed between the feed roller and the registration roller in a sheet conveyance path through which the sheet is transported. The movable sheet guide wraps more of the sheet around the registration roller as a degree of tension of the sheet increases by moving against a bias force exerted by the bias member.

Another illustrative embodiment of the present invention provides an image forming apparatus that includes an ink-ejecting device to eject ink droplets onto sheets of recording media and the sheet feeder described above.

Yet another illustrative embodiment of the present invention provides an image forming apparatus that includes an image carrier, a toner image forming unit to form a toner image on the image carrier, a transfer device to transfer the toner image from the image carrier onto a sheet of recording media in a transfer area where the image carrier faces the sheet, and the sheet feeder described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
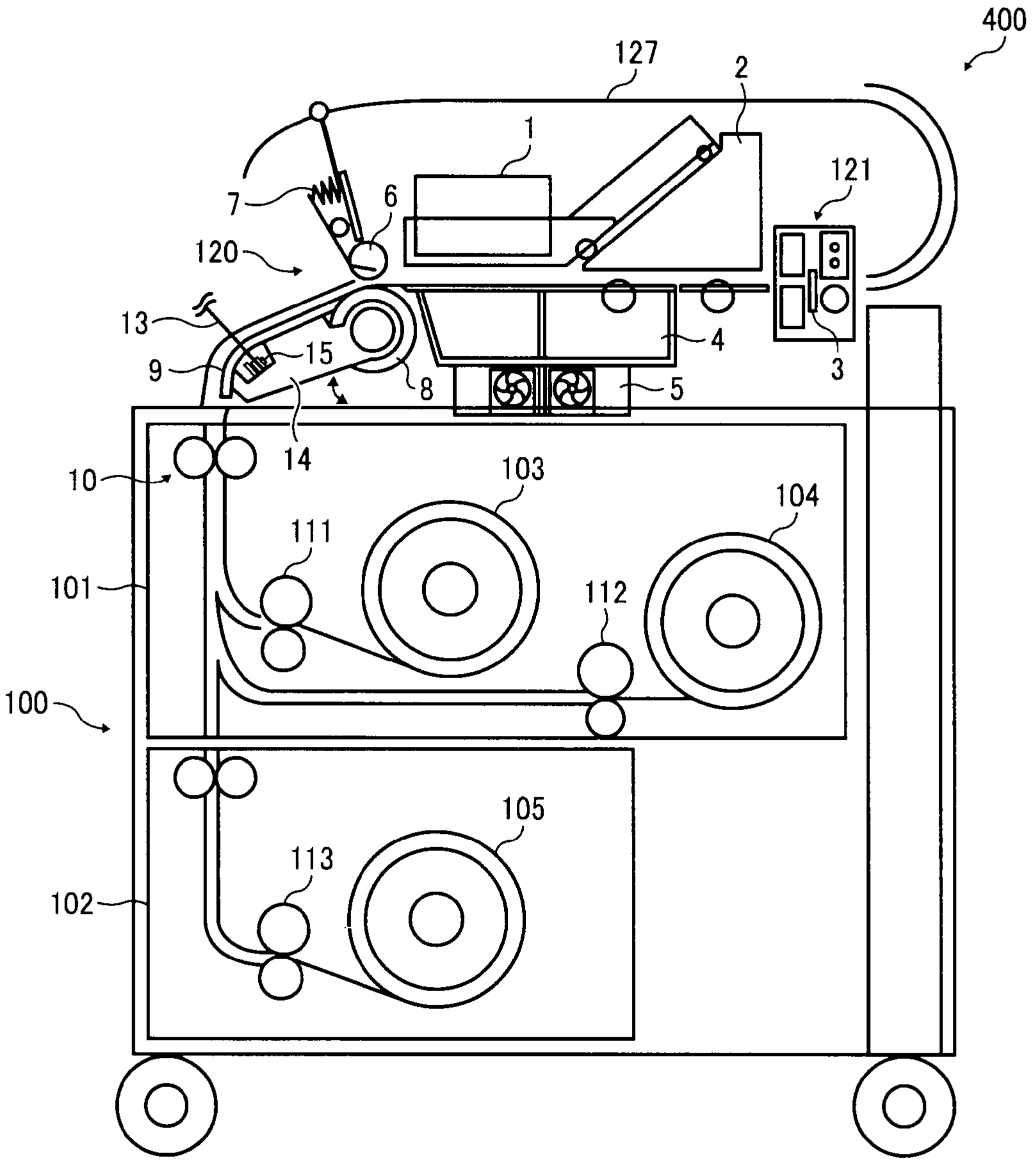
FIG. 1 is a schematic view illustrating an ink-ejecting image forming apparatus according to an illustrative embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming apparatus according to an illustrative embodiment of the present invention is described.

FIG. 1 is a schematic view illustrating an ink-ejecting image forming apparatus 400 according to an illustrative embodiment of the present invention.

The image forming apparatus 400 includes an image forming unit 120 that includes a carriage 1 and a carriage stay 2, a cutter unit 121 that includes a cutter 3, a suction stay 4, a suction fan 5, a pressure roller 6, a pressure unit 7, a registration roller 8 facing the pressure roller 6, a movable guide plate 9, and a paper feeder 100. The paper feeder 100 includes paper roller trays 101 and 102, a pair of intermediate rollers 10, pairs of feed rollers 111, 112, and 113, and paper rolls 103, 104, and 105. A sheet is unreeled by the pair of feed rollers 111 from the paper roll 103, and then the pair of intermediate rollers 10 conveys the sheet to the movable guide plate 9. While the movable guide plate 9 keeps the sheet taut, the pressure roller 6 is pressed against the sheet by the pressure unit 7, and the registration roller 8 transports the sheet further.

The carriage 1 in the image forming unit 120 is supported by the carriage stay 2 movably in a main scanning direction. The carriage 1 includes ink-ejecting heads for ejecting yellow (Y), magenta (M), cyan (C), and black (K) ink droplets, respectively, onto the sheet transported by the registration roller 8.

The image forming apparatus 400 further includes an ink supply unit, not shown, in which ink cartridges, not shown, for the respective colors are removably installed. The ink supply unit further includes ink supply tubes, not shown, extending to the ink-ejecting heads for respective colors, to supply ink from the respective ink cartridges to the corresponding ink-ejecting heads individually.

The paper roll trays 101 and 102 can be pulled out from a main body of the image forming apparatus 400 to the left in FIG. 1, and attachment of paper rolls or removal of jammed paper can be performed with the paper roller tray 101 or 102 pulled out.

The paper roller tray 101 can accommodate two paper rolls (paper rolls 103 and 104), and the paper roll tray 102 can accommodate one paper roll (paper roll 105). Each of the paper rolls 103, 104, and 105 is formed with a long sheet winding around a paper tube and is set on the paper roller tray 101 or 102 rotatably on an axis of the paper tube. Additionally, the feed rollers 111, 112, and 113 are disposed adjacent to the paper rolls 103, 104, and 105, respectively.

The registration roller 8 conveys the sheet unreeled by the feed roller 111, 112, or 113 to the image forming unit 120, timed to coincide with image formation by the image forming unit 120. The sheet thus fed to the image forming unit 120 is transported along an upper surface of the suction stay 4, facing the carriage 1, to an ink-ejection area to which the ink-ejecting heads of the carriage 1 eject ink droplets. In the ink-ejection area, the sheet is attracted by the suction fan 5 to the upper surface of the suction stay 4 at least while ink droplets are ejected onto the sheet. Then, a first line of an image is formed by driving the ink-ejecting heads according to image signals while moving the carriage 1, and thus ink droplets are ejected onto the sheet that is kept motionless. Subsequently, the sheet is transported for a given distance, and then a subsequent line is recorded thereon. More specifically, recording one line of the image on the sheet that remains motionless and transporting the sheet a predetermined distance by the registration roller 8 are repeated alternately, and thus the sheet is transported intermittently.

In the configuration using paper rolls as in the present embodiment, when the distance between the leading edge of the sheet and the cuter 3 of the cutter unit 121 reaches a predetermined distance, conveyance of the sheet is stopped and then the sheet is cut with the cutter 3. The sheet thus cut is discharged onto a discharge tray 127. Additionally, the remaining sheet is reeled to a position where subsequent image formation is started after the sheet is cut with the cutter 3. For example, when images are formed continuously, the paper roll 103, 104, or 105 and the corresponding feed roller (111, 112, or 113) are rotated in reverse (counterclockwise in FIG. 1), reeling the sheet on the paper roll 103, 104, or 105, until the leading edge of the sheet returns to the position sandwiched between the pressure roller 6 and the registration roller 8. By contrast, when images are not formed continuously, the sheet is reeled on the paper roll 103, 104, or 105 until the leading edge of the sheet returns to the position adjacent to the corresponding feed rollers (111, 112, or 113).

It is to be noted that, in FIG. 1, reference numbers 13, 14, and 15 represent a tension spring, a bracket, and pulleys, respectively.

Next, a distinctive feature of the present embodiment is described with reference to FIGS. 2 through 4.

Figure 2:
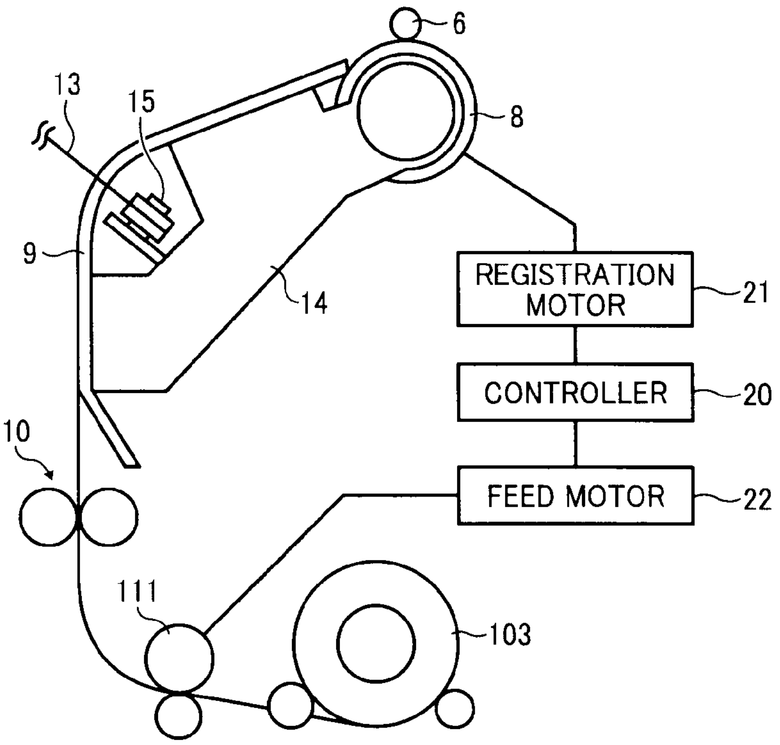
FIG. 2 is a schematic diagram illustrating a configuration of a mechanism to bias the movable guide plate, in which the movable guide plate is at an upper limit position.
Figure 3:
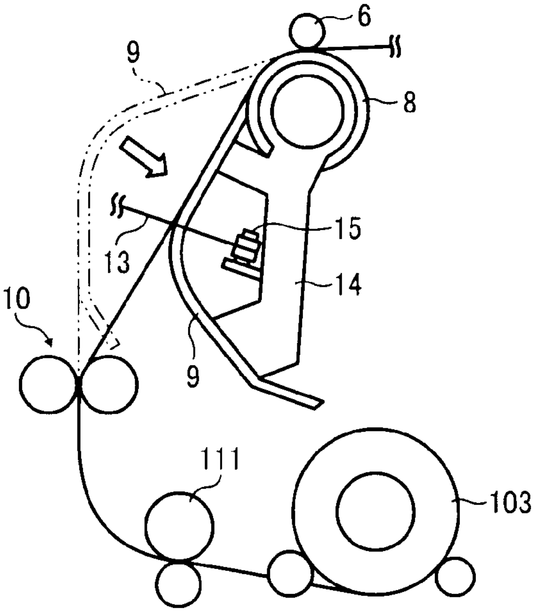
FIG. 3 is a schematic diagram illustrating the mechanism to bias the movable guide plate, in which the movable guide plate is at a lower limit position.
Figure 4:
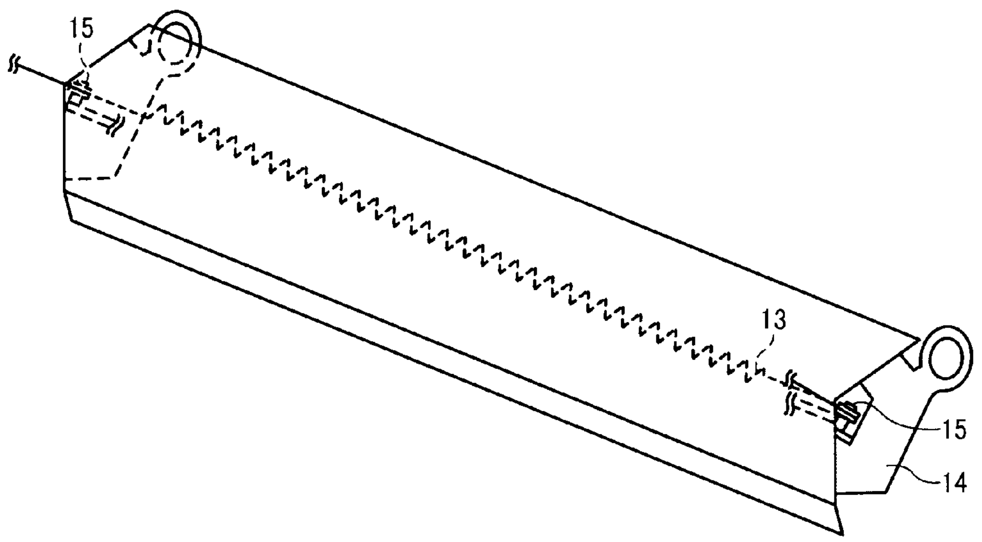
FIG. 4 is a schematic perspective diagram illustrating the mechanism to bias the movable guide plate.

FIGS. 2 and 3 are schematic diagrams illustrating a configuration of a mechanism to bias the movable guide plate, in which the movable guide plate is at an upper limit position and a lower limit position, respectively. FIG. 4 is a schematic perspective diagram illustrating the mechanism to bias the movable guide plate.

As shown in FIG. 2, the movable guide plate 9, which guides the sheet transported by the feed rollers 111, 112, or 113 and the pair of intermediate rollers 10 to a registration nip where the pressure roller 6 is pressed against the registration roller 8, is attached to a bracket 14 serving as a support member to support the guide plate 9 movably. The bracket 14 is attached to the main body of the image forming apparatus 400 pivotally around an axis identical to that of the registration roller 8. The feed rollers 111, 112, and 113 and the registration roller 8 are respectively driven by a feed motor 22 and a registration motor 21, which are controlled by a controller 20. Additionally, as shown in FIG. 4, the pulleys 15 are provided in both end portions in a longitudinal direction of the bracket 14 extending in the main scanning direction, and the tension spring 13 is stretched by the pulleys 15. Both ends of the tension spring 13 are supported by supporters, not shown, of the image forming apparatus 400.

In an initial standby state in which the sheet is not fed to the image forming unit 120 from the paper roll 103, 104, or 105 by the feed roller 111, 112, or 113, the movable guide plate 9 is positioned at the upper limit position in a movable range thereof by elastic force exerted by the tension spring 13 as shown in FIG. 2. In the present embodiment, the movable guide plate 9 at the upper limit position (shown in FIG. 2) guides the sheet so that the sheet enters the registration nip in a direction tangential to the registration roller 8, and thus the sheet can enter the registration nip smoothly.

During image formation, the sheet is transported by the intermediate rollers 10 along a guide surface of the movable guide plate 9 to the registration nip and then is sandwiched between the pressure roller 6 and the registration roller 8. At this time, the sheet is stretched by the feed roller 111, 112, or 113, the registration roller 8, and the like and thus becomes tense. As a result, the sheet applies downward force to the movable guide plate 9 against the bias force exerted by the tension spring 13, and then the movable guide plate 9 rotates counterclockwise in FIG. 3 together with the bracket 14 downward from the initial position in the standby state (hereinafter also "standby position"), as shown in FIG. 3. As the movable guide plate 9 thus descends, the tension spring 13 is stretched, and resilience of the tension spring 13 acts on the movable guide plate 9 via the pulleys 15 and the bracket 14, thus biasing the movable guide plate 9 toward the standby position. Then, the sheet is kept taut by the movable guide plate 9 because the movable guide plate 9 is biased by the tension spring 14. Accordingly, the sheet can be prevented from being slackened or skewing.

Additionally, in the present embodiment, the movable guide plate 9, which is movable via the bracket 14 relative to the main body of the apparatus, is kept in contact with a back side of the sheet with the bias force of the tension spring 13. Therefore, even when the sheet is slackened due to changes in the degree of tension of the sheet stretched by the feed roller 111, 112, or 113, the registration roller 8, and the like, the tension of the sheet can be adjusted because the movable guide plate 9 supports the sheet from the back side with the bias force of the tension spring 13. Consequently, slackage of the sheet can be reduced or eliminated.

It is to be noted that, to enhance compliance of the sheet, the weight of the movable guide plate 9 is preferably smaller and the spring constant of the tension spring 13 is preferably lower. For example, the spring constant may be within a range of from 0.01 N/mm to 0.02 N/mm.

Figure 5:
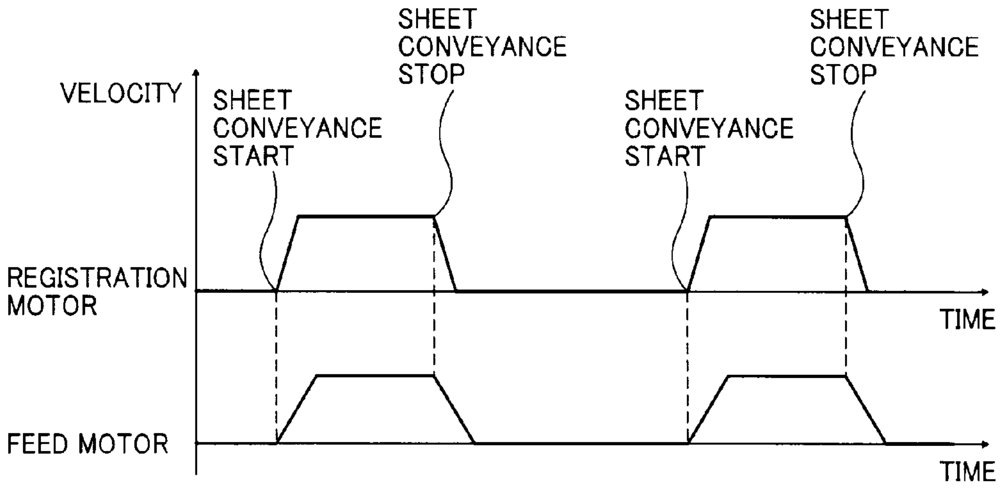
FIG. 5 is a driving timing chart of a sheet feed motor and a registration motor for driving a feed roller and a registration roller, respectively.

FIG. 5 is a driving timing chart of the sheet feed motor 22 and the registration motor 21 for driving the feed roller (111, 112, or 113) and the registration roller 8, respectively.

In response to demand for faster formation speeds, it is desirable that the registration roller 8 send the sheet quickly to the image formation unit 120. Accordingly, the registration motor 21 is preferably able to start up immediately to rotate the registration roller 8 promptly. For example, the time required to start up the registration motor 21 is within a range from 50 ms to 100 ms. Additionally, as the moment of inertia of the paper rollers 103, 104, and 105 is relatively large, it is preferable that the feed motor 22 be started up gradually to rotate the feed roller 111, 112, or 113 gradually, considering torque margin. For example, the time required to start up the feed motor 22 is within a range from 150 ms to 200 ms. In this configuration, the rotational velocity at start-up differs between the registration roller 8 and the feed roller 111, 112, or 113, that is, the registration roller 8 transports the sheet faster than the pair of feed rollers 111, 112, or 113. As a result, the sheet is subjected to force in the reverse direction to the direction in which the sheet is transported (hereinafter "sheet conveyance direction"), that is, force to stretch the sheet backward (hereinafter "back tension"). As the back tension exerted on the paper roll 103, 104, or 105 increases, the force to pull the sheet in the reverse direction to the sheet conveyance direction increases, and accordingly the sheet is more likely to slip on the registration roller 8. Thus, sheet conveyance failure can occur.

Figure 6:
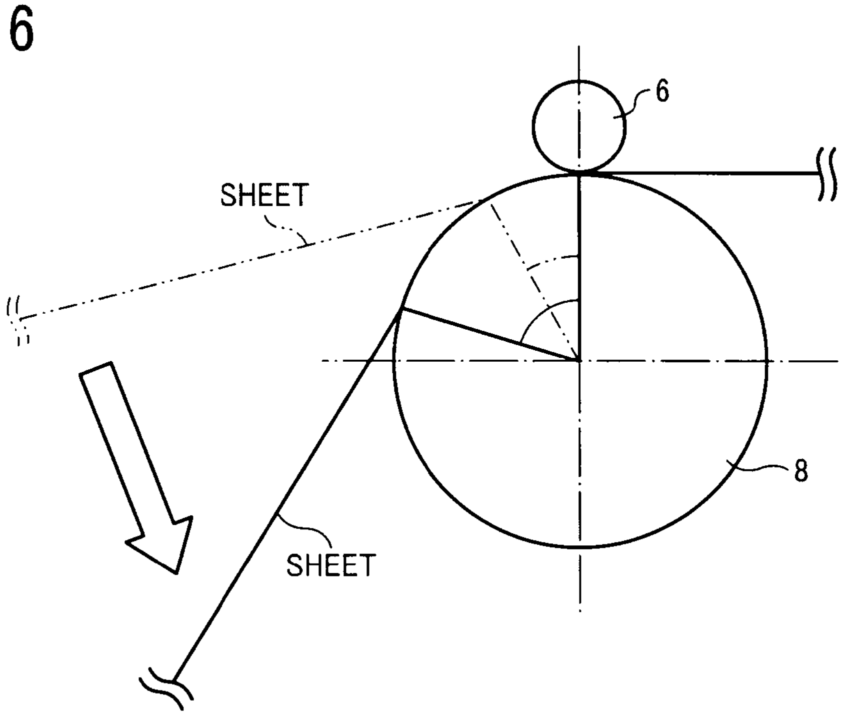
FIG. 6 is a schematic diagram illustrating an area of the sheet winding around the registration roller shown in FIG. 2.

FIG. 6 is a schematic diagram illustrating an area of the sheet winding around the registration roller 8.

In the present embodiment, as shown in FIG. 6, the movable guide plate 9 is rotatable coaxially with the registration roller 8 via the bracket 14, keeping the sheet taut, and then the sheet pushes the movable guide plate 9 downward. As the movable guide plate 9 descends, the area of the sheet winding around the registration roller 8 increases. With this configuration, a contact area between the registration roller 8 and the sheet increases, that is, frictional force therebetween increases, and thus the sheet is less likely to slip on the registration roller 8. Therefore, the force of the registration roller 8 to transport the sheet increases, reducing or preventing sheet conveyance failure.

More specifically, as the movable guide plate 9 pushed by the sheet descends, the tension spring 13 is stretched, which increases its resilience increases. Accordingly, the bias force exerted by the tension spring 13 to the movable guide plate 9 increases. Therefore, the force of the movable guide plate 9 that tenses the sheet increases, and the area of the sheet winding around the registration roller 8 increases. In other words, the movable guide plate 9 wraps more of the sheet around the registration roller 8 as a degree of tension of the sheet increases by moving against a bias force exerted by the tension spring 13. Consequently, the frictional force between the sheet and the registration roller 8 increases, and thus the sheet is less likely to slip on the registration roller 8. Therefore, the force of the registration roller 8 to transport the sheet increases, reducing or preventing sheet conveyance failure.

Figure 7:
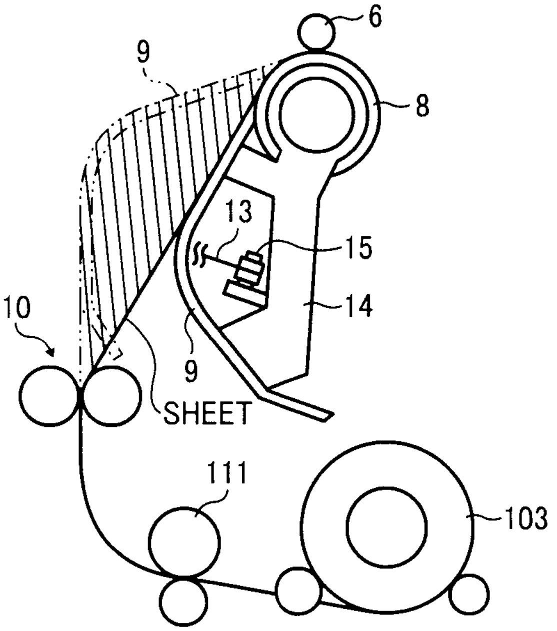
FIG. 7 is a schematic diagram illustrating the mechanism to bias the movable guide plate in which a buffer amount against differences in the start-up time between the feed motor and the registration motor is maximized.

As shown in FIG. 7, when the movable guide plate 9 is configured to rotate coaxially with the registration roller 8 as described above, a buffer amount against differences in the start-up time between the feed motor 22 and the registration motor 21, which is a hatched area shown in FIG. 7, can be maximized between the intermediate rollers 10 and the registration roller 8. It is to be noted that, in this specification, "the buffer amount is maximized" means that the sheet conveyance path is aligned with a tangential line to both the registration roller 8 and the pair of intermediate rollers 10.

Because the maximum buffer amount can be attained against differences in the start-up time between the feed motor 22 and the registration motor 21, the feed motor 22 can be a low-velocity motor, whereas the registration motor 21 can be a high-velocity motor. More specifically, because the maximum buffer amount can be attained against differences in the start-up time between the feed motor 22 and the registration motor 21, the sheet conveyance velocity can be increases, and the feed motor 22 can be a low-velocity motor having a relatively large torque, whereas the registration motor 21 can be a high-velocity motor having a relatively small torque. Therefore, the performance of the apparatus can be enhanced while keeping the cost lower.

Additionally, because the movable guide plate 9 is rotatable about the axis of the registration roller 8 via the bracket 14, the sheet moving to the registration nip is constantly kept tangential to the registration roller 8. Thus, the sheet can be transported to the registration nip smoothly and kept taut reliably. Additionally, because the sheet guided by the movable guide plate 9 is received on the circumferential surface of the registration roller 8, the sheet can be transported to the registration nip in conformity with the circumferential surface of the registration roller 8. Thus, the sheet can be transported to the registration nip smoothly and kept taut reliably.

As described below, in the first embodiment, the image forming apparatus that includes an ink-ejecting device to eject ink droplets onto sheets of recording media in order to form images thereon uses, as a sheet feeder to feed the sheet to an area facing the ink-ejecting device, the above-described paper feeder to transport the sheet unreeled from the paper roller. Therefore, sheet conveyance failure can be prevented while attaining satisfactory images. In particular, using the above-described paper feeder is advantageous in a configuration in which the feed roller and the registration roller are driven intermittently because the possibility of the above-described sheet conveyance failure, which is caused by differences in velocity at the start-up between the registration roller and the feed roller, can increase in such a configuration.

Second Embodiment

A second embodiment is described below with reference to FIG. 8 that is a schematic diagram of an image forming apparatus according to the second embodiment.

Figure 8:
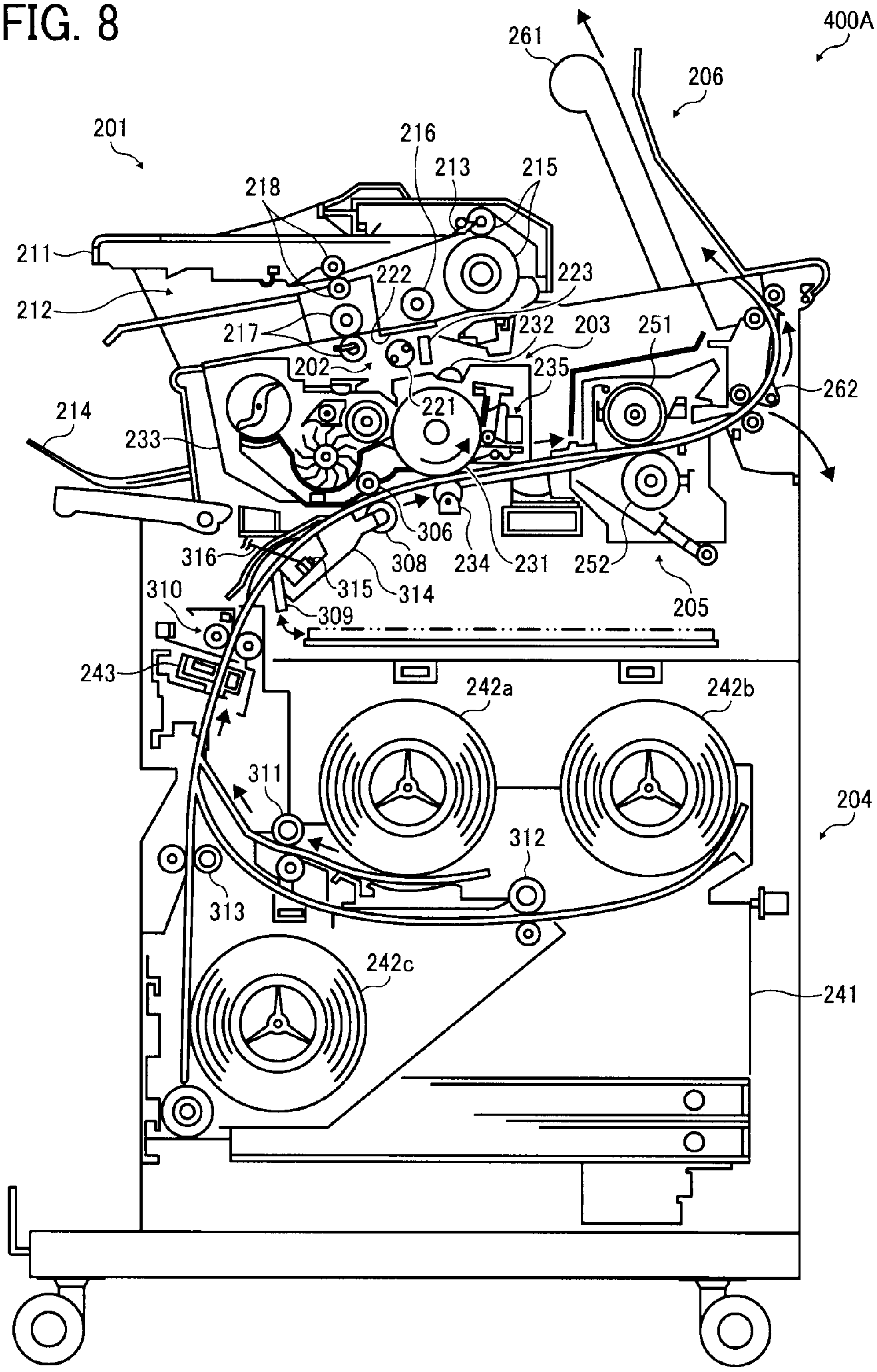
FIG. 8 is a schematic diagram illustrating an image forming apparatus according to another illustrative embodiment.

Referring to FIG. 8, an image forming apparatus 400A includes a document conveyance unit 201 capable of causing an original document to switchback, an image reading unit 202 to read image data of the original document, an image forming unit 203 to form images on a recording sheet, a paper feeder 204 to feed the recording sheet to the image forming unit 203, a fixing unit 205 to fix the image on the recording sheet, and a discharge unit 206 to which the recording sheet is discharged. Although not shown, the image forming apparatus 400A further includes an operation panel via which commands, such as operation start and copying repeat, and data relating to the recording sheet are input.

The document conveyance unit 201 includes a document table 211, multiple conveyance rollers to transport the original document, a document discharge port 212, a switch pawl 213, and a discharge tray 214 to which the original document is discharged after copying. When copied repeatedly, the original document switchbacks, guided by the switch pawl 213, and is tentatively discharged through the document discharge port 212. The multiple conveyance rollers include a first pair of conveyance rollers 215, a second conveyance roller 216, a third pair of conveyance rollers 217, and a fourth pair of conveyance rollers 218. The fourth pair of conveyance rollers 218 is driven when the original document is switchbacked. It is to be noted that the document conveyance unit 201 can transport wide and long sheets such as A0-size sheets.

The image reading unit 202 includes an exposure lamp 221, a platen glass 222, and a lens 223. The image reading unit 202 is fixed to the apparatus body and scans the original document transported on the platen glass 222 by the document conveyance unit 201 to capture the image data.

The image forming unit 203 includes a photoconductor drum 231 serving as an image carrier, a charger 232, a development device 233, a transfer roller 234, and a cleaning unit 235.

The paper feeder 204 includes a sheet tray 241 and can accommodate three paper rolls 242*a*, 242*b*, and 242*c*. For example, the long sheet unreeled from the paper roll 242*a* on the upper left on the sheet tray 241 in FIG. 8 is transported in the direction indicated by arrows shown in FIG. 8 to the image forming unit 203 and is cut by a cutter unit 243 into a sheet having a predetermined length.

The fixing unit 205 includes a fixing roller 251 and a pressure roller 252 and fixes a toner image formed on the sheet thereon with heat and pressure. The discharge unit 206 includes a stacker 261 and a switch pawl 262.

The image forming apparatus 400A further includes a pressure roller 306, a registration roller 308, a movable guide plate 309, a pair of intermediate rollers 310, feed rollers 311, 312, and 313, a bracket 314, a pulley 315, and a tension spring 316.

Copying operation performed by the image forming apparatus 400A configured as described above is described below.

Initially, the original document is set on the document table 211 with its image surface faced up. Then, the first pair of conveyance rollers 215 sandwiches therebetween a first end of the sheet on the leading side in a direction in which the original document is transported (hereinafter "document conveyance direction"), and the sheet is transported toward the image reading unit 202. Subsequently, at a predetermined timing, image forming components such as the exposure lamp 221, the photoconductor drum 231, the charger 232, the development device 233, the transfer roller 234, and the cleaning unit 235 are activated. The sheet is transported with its leading edge (first end) coincided with an image formed on the photoconductor drum 231.

When the original document transported by the second conveyance roller 216 passes above the platen glass 222, the exposure lamp 221 emits light to the original document. The light reflected by the original document is imaged on the photoconductor drum 231 via the lens 223, and thus an electrostatic latent image is formed thereon. Subsequently, the development device 233 develops the electrostatic latent image with toner into a toner image, after which a transfer bias within a range of from 1 kV to 4 kV is applied to the transfer roller 234, and the transfer roller 234 transfers the toner image onto the sheet. The toner image is then thermally fixed thereon by the fixing roller 251 and the pressure roller 252 while the sheet passes through the fixing unit 205, after which the sheet is discharged to the stacker 261. It is to be noted that, alternatively, the sheet can be discharged from a back portion of the apparatus by switching the position of the switch pawl 262.

After passing above the platen glass 222 of the image reading unit 202, the original document is sandwiched between the third pair of conveyance rollers 217 and discharged onto the discharge tray 214. It is to be noted that, to make copies of the original document repeatedly, the third pair of conveyance rollers 217, the second conveyance roller 216, and the first pair of conveyance rollers 215 start rotating in reverse sequentially in that order after a given time period from when a second end of the original document, on the trailing side in the document conveyance direction, passes above the platen glass 222. Thus, the original document starts switchback (reverse conveyance). At this time, the switch pawl 213 is switched to the position to send the original document to the document discharge port 212, and the second end of the original document, which is on the leading side in the reverse conveyance, is sandwiched by the fourth pair of conveyance rollers 218 and then tentatively discharged through the document discharge port 212. Then, after the first end of the original document, which is on the trailing side in the reverse conveyance, passes above the platen glass 222, the respective rollers stop rotating. Subsequently, the original document is again fed to the image reading unit 202, and image forming operations and sheet feeding for the second copy are started accordingly. These operations are repeated in accordance with the number of copies designated via the operation panel, not shown.

Next, a distinctive feature of the present embodiment is described with reference to FIGS. 9 through 13.

Figure 9:
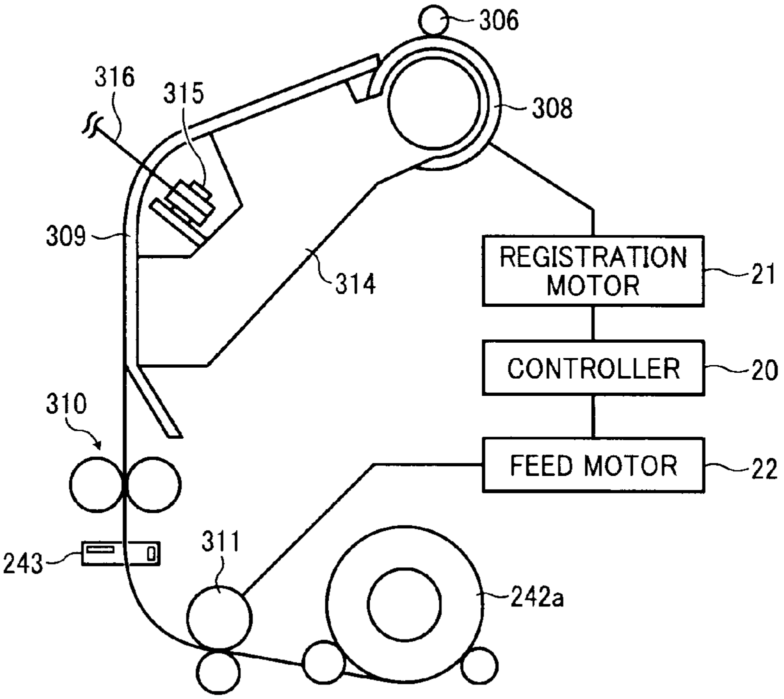
FIG. 9 is a schematic diagram illustrating a configuration of a mechanism to bias the movable guide plate, in which the movable guide plate is at an upper limit position.
Figure 10:
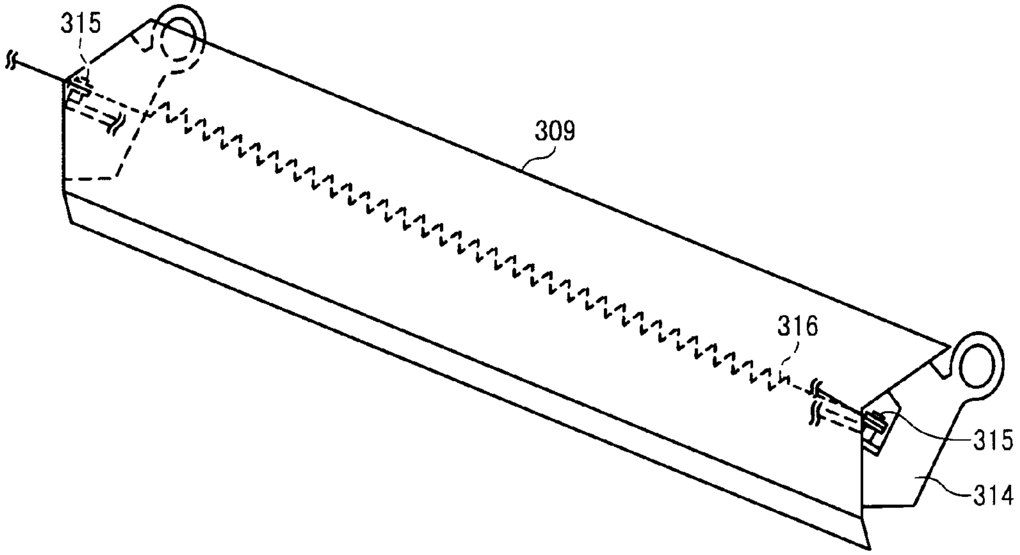
FIG. 10 is a schematic perspective diagram illustrating the configuration of the mechanism to bias the movable guide plate.
Figure 11:
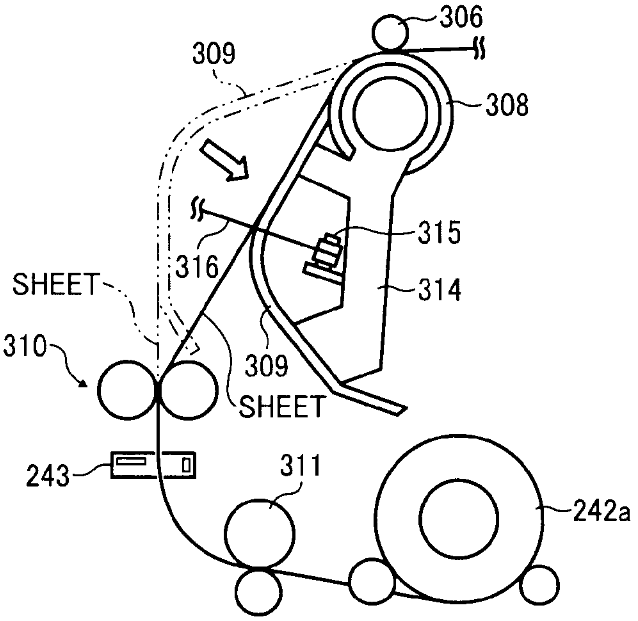
FIG. 11 is a schematic diagram illustrating a configuration of a mechanism to bias the movable guide plate, in which the movable guide plate is at a lower limit position.

FIGS. 9 and 11 are schematic diagrams illustrating a configuration of a mechanism to bias the movable guide plate, in which the movable guide plate 309 is at an upper limit position and a lower limit position, respectively. FIG. 10 is a schematic perspective diagram of the mechanism to bias the movable guide plate and corresponds to FIG. 4, which illustrates the mechanism to bias the movable guide plate in the first embodiment, the only difference between FIGS. 4 and 10 being the reference numbers of the components.

As shown in FIG. 9, the movable guide plate 309, which guides the sheet transported by the feed roller 311, 312, or 313 and the pair of intermediate rollers 310 to a registration nip where the pressure roller 306 is pressed against the registration roller 308, is attached to the bracket 314. The bracket 314 is attached to the main body of the image forming apparatus 400A pivotally around an axis identical to that of the registration roller 308.

Additionally, as shown in FIG. 10, the pulleys 315 are provided in both end portions in a longitudinal direction of the bracket 314 extending in the main scanning direction, and the tension spring 316 is stretched by the pulleys 315. Both ends of the tension spring 316 are supported by supporters, not shown, of the image forming apparatus 400A.

In an initial standby state in which the sheet is not fed to the image forming unit 203 from the paper roller 242*a*, 242*b*, or 242*c* by the pair of feed rollers 311, 312, or 313, the movable guide plate 309 is positioned at the upper limit position in a movable range thereof with elastic force exerted by the tension spring 316 as shown in FIG. 10. At that time, the movable guide plate 309 at the upper limit position guides the sheet so that the sheet enters the registration nip in a direction tangential to the registration roller 308, and thus the sheet can enter the registration nip smoothly.

During image formation, the sheet is transported by the intermediate rollers 310 along a guide surface of the movable guide plate 309 to the registration nip and then sandwiched between the pressure roller 306 and the registration roller 308. At that time, the sheet is stretched by the feed roller 311, 312, or 313, the registration roller 308, and the like and thus becomes tense. As a result, the sheet applies downward force to the movable guide plate 309 against the bias force exerted by the tension spring 316, which causes the movable guide plate 309 to rotate counterclockwise in FIG. 10 together with the bracket 314 downward from the initial position in the standby state (standby position), as shown in FIG. 11. As the movable guide plate 309 thus descends, the tension spring 316 is stretches, and resilience of the tension spring 316 acts on the movable guide plate 309 via the pulleys 315 and the bracket 314, thus biasing the movable guide plate 309 toward the standby position. Then, the sheet is kept taut by the movable guide plate 309 because the movable guide plate 309 is biased by the tension spring 316, thus preventing the sheet from being slackened or skewing.

It is to be noted that the sheet may be cut by the cutter unit 243 after applying downward force to the movable guide plate 309 against the bias force exerted by the tension spring 316.

Additionally, in the present embodiment, the movable guide plate 309, which is movable via the bracket 314 relative to the main body of the apparatus, is kept in contact with a back side of the sheet with the bias force of the tension spring 316. Therefore, even when the sheet is slackened due to changes in the degree of tension of the sheet stretched by the feed roller 311, 312, or 313, the registration roller 308, and the like, the tension of the sheet can be adjusted because the movable guide plate 309 supports the sheet from the back side with the bias force of the tension spring 316. Consequently, slackage of the sheet can be reduced or eliminated.

It is to be noted that, to enhance compliance of the sheet, the weight of the movable guide plate 309 is preferably smaller and the spring constant of the tension spring 316 is preferably lower. For example, the spring constant may be within a range of from 0.01 N/mm to 0.02 N/mm.

Additionally, in response to demand for faster image formation speeds, it is desirable that the registration roller 308 send the sheet quickly to the image formation unit 203. Accordingly, the registration motor 21 is preferably able to start up immediately to rotate the registration roller 308 promptly. For example, the time required to start up the registration motor 21 is within a range from 50 ms to 100 ms. Additionally, as the moment of inertia of the paper roller 242*a*, 242*b*, and 242*c* is relatively large, it is preferable that the feed motor 22 be started up gradually to rotate the feed roller 311, 312, or 313 gradually, considering torque margin. For example, the time required to start up the feed motor 22 is within a range from 150 ms to 200 ms. In this configuration, the rotational velocity at start-up differs between the registration roller 308 and the feed roller 311, 312, or 313, that is, the registration roller 308 transports the sheet faster than the pair of feed rollers 311, 312, or 313 does. As a result, the sheet is subjected to force in the reverse direction to the sheet conveyance direction, that is, a force that stretches the sheet backward (back tension). As the back tension exerted on the paper roller 242*a*, 242*b*, or 242*c* increases, the force to pull the sheet in the reverse direction to the sheet conveyance direction increases, and accordingly the sheet is more likely to slip on the registration roller 308. Thus, sheet conveyance failure can occur.

Figure 12:
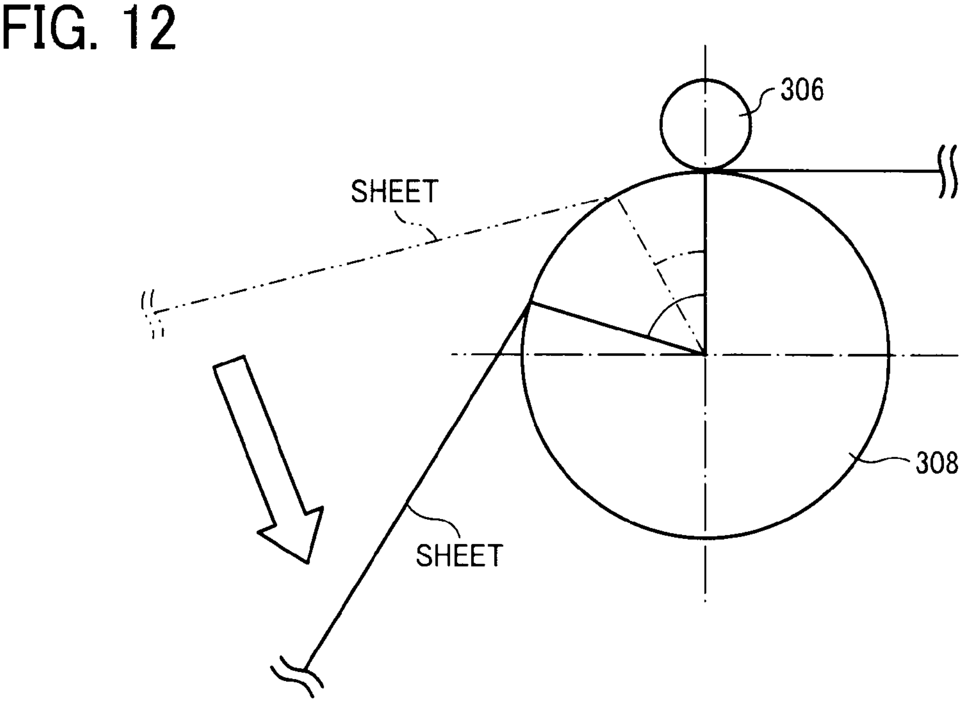
FIG. 12 is a schematic diagram illustrating an area of the sheet winding around the registration roller shown in FIG. 9.

In view of the foregoing, in the present embodiment, as shown in FIG. 12, the movable guide plate 309 is rotatable coaxially with the registration roller 308 via the bracket 314, keeping the sheet taut, and then the sheet pushes the movable guide plate 309 downward. As the movable guide plate 309 descends, the area of the sheet winding around the registration roller 308 increases. With this configuration, a contact area between the registration roller 308 and the sheet increases, that is, frictional force therebetween increases, and thus the sheet is less likely to slip on the registration roller 308. Therefore, the force of the registration roller 308 to transport the sheet increases, reducing or preventing sheet conveyance failure.

More specifically, as the movable guide plate 309 pushed by the sheet descends, the tension spring 316 is stretched, which increases its resilience increases. Accordingly, the bias force exerted by the tension spring 316 to the movable guide plate 309 increases. Therefore, the force of the movable guide plate 309 that tenses the sheet increases. Accordingly, the area of the sheet winding around the registration roller 308 increases, thereby increasing the frictional force between the sheet and the registration roller 308, and thus the sheet is less likely to slip on the registration roller 308. Therefore, the force of the registration roller 308 to transport the sheet increases, reducing or preventing sheet conveyance failure.

Figure 13:
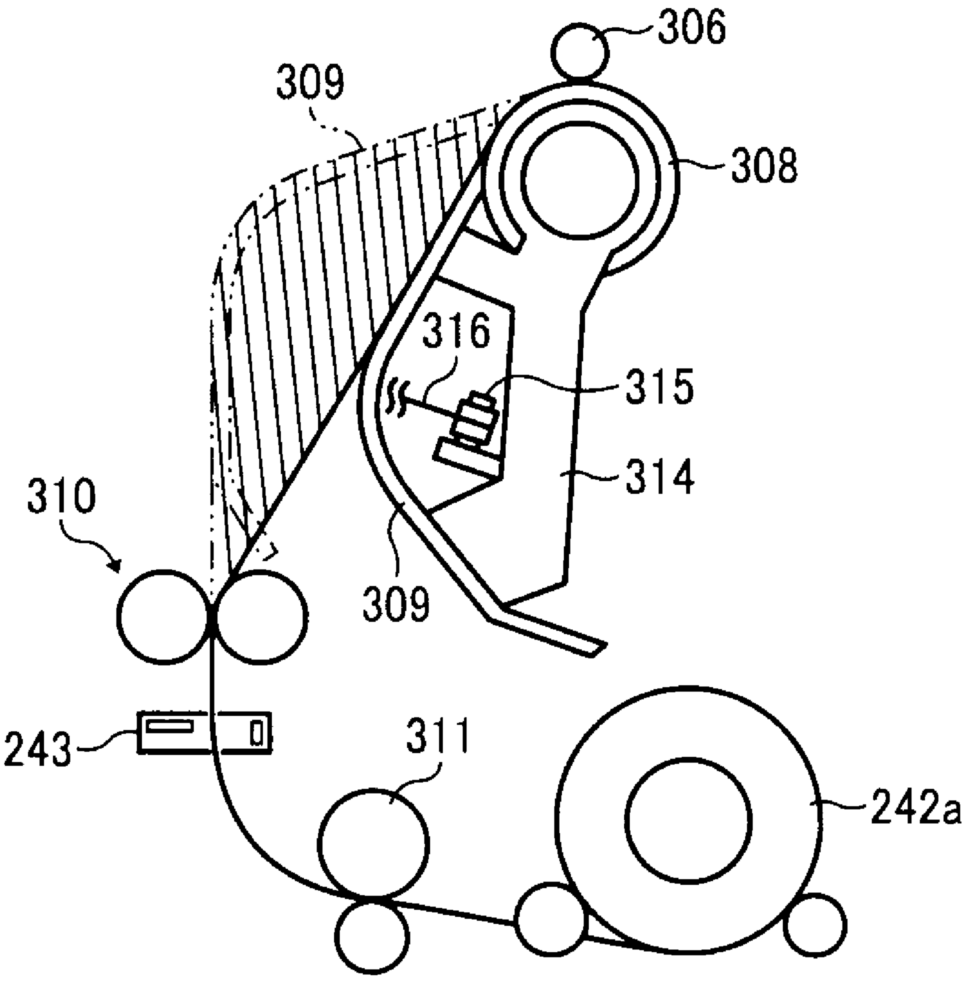
FIG. 13 is a schematic diagram illustrating the mechanism to bias the movable guide plate in which a buffer amount against differences in the start-up time between the feed motor and the registration motor is maximized.

As shown in FIG. 13, when the movable guide plate 309 is configured to rotate coaxially with the registration roller 308 as described above, a buffer amount against differences in the start-up time between the feed motor 22 and the registration motor 21, which is a hatched area shown in FIG. 13, can be the maximized between the intermediate rollers 310 and the registration roller 308. It is to be noted that, in this specification, "the buffer amount is maximized" means that the sheet conveyance path is aligned with a tangential line to both the registration roller 308 and the intermediate roller 310.

Because the maximum buffer amount can be attained against differences in the start-up time between the feed motor 22 and the registration motor 21, the feed motor 22 can be a low-velocity motor, whereas the registration motor 21 can be a high-velocity motor. More specifically, because the maximum buffer amount can be attained against differences in the start-up time between the feed motor 22 and the registration motor 21, the sheet conveyance velocity can be increases, and the feed motor 22 can be a low-velocity motor having a relatively large torque, whereas the registration motor 21 can be a high-velocity motor having a relatively small torque. Therefore, the performance of the apparatus can be enhanced while keeping the cost lower.

Additionally, because the movable guide plate 309 is rotatable about the axis of the registration roller 308 via the bracket 314, the sheet moving to the registration nip is constantly kept tangential to the registration roller 308. Thus, the sheet can be transported to the registration nip smoothly and kept taut reliably. Additionally, because the sheet guided by the movable guide plate 309 is received on the circumferential surface of the registration roller 308, the sheet can be transported to the registration nip along the circumferential surface of the registration roller 308. Thus, the sheet can be transported to the registration nip smoothly and kept taut reliably.

Thus, the above-described embodiments provide a paper feeder for accommodating a paper roll, that includes a feed roller to unreel a sheet from the paper roll, a registration roller to transport the sheet unreeled by the feed roller, a movable sheet guide to guide the sheet to the registration roller, disposed between the feed roller and the registration roller in a sheet conveyance path through which the sheet is transported, a bracket to support the sheet guide movably relative to an apparatus body, and a tension spring to bias the sheet guide toward the sheet. The sheet guide is disposed in contact with a back surface of the sheet stretched by the feed roller and the registration roller. As the force applied to the sheet guide increases in accordance with changes in the degree of tension of the sheet thus stretched, the sheet guide moves against the force exerted by the tension spring to change the sheet conveyance path so that the area of the sheet winding around the registration roller is increased. In the above-described embodiments, as the force applied to the sheet guide increases in accordance with changes in the degree of tension of the sheet unreeled by the feed roller, that is, as the degree of tension of the sheet increases, the area of the sheet winding around the registration roller is increased. With this configuration, the contact area between the registration roller and the sheet increases with the increase in the degree of tension of the sheet, thus increasing the frictional force between the registration roller and the sheet. The increase in the frictional force can make the sheet less likely to slip on the registration roller, and thus sheet conveyance failure can be prevented or reduced. Additionally, the movable sheet guide is configured to guide the sheet in a tangential direction to the registration roller toward the registration roller, and thus the sheet can enter the registration nip smoothly. The sheet feeder according to the above described embodiments further includes the feed motor to drive the feed roller, the registration motor to drive the registration roller, and the controller capable of gradually starting up the feed motor whereas rapidly starting up the registration motor. Therefore, the sheet can be transported speedily in the registration portion, thus increasing the image formation linear velocity, and can be transported reliably in the feeding portion considering torque margin because the moment of inertia of the paper roller is relatively large. Additionally, using a low-velocity motor and a high-velocity motor as the feed motor and the registration motor, respectively, can attain higher performance with a lower cost. Additionally, the movable sheet guide is configured to rotate coaxially with the registration roller, and the sheet guided by the guide surface of the sheet guide enters the registration nip in a direction tangential to the registration roller. Thus, the sheet can enter the registration nip smoothly. Additionally, because the sheet is received by the registration roller from the movable sheet on the circumferential surface of the registration roller, the sheet can be transported to the registration nip in conformity with the circumferential surface of the registration roller. Thus, the sheet can be transported to the registration nip smoothly and kept taut reliably.

In the second embodiment, the image forming apparatus that includes an image carrier, a toner image forming unit to form a toner image on the image carrier, a transfer device to transfer the toner image onto a sheet (recording medium) in a transfer area where the image carrier faces the sheet uses, as a sheet feeder to feed the sheet to the transfer area, the above-described paper feeder to transport the sheet unreeled from the paper roller. Therefore, sheet conveyance failure can be prevented while attaining satisfactory images.

Numerous additional modifications and variations are possible in light of the above teachings. It is therefore to be understood that, within the scope of the appended claims, the disclosure of this patent specification may be practiced otherwise than as specifically described herein.

What is claimed is:

1. A sheet feeder for transporting a sheet unreeled from a roll to an image forming unit, the sheet feeder comprising:

a feed roller to unreel the sheet from the roll;

a registration roller to transport the sheet unreeled by the feed roller to the image forming unit;

a movable sheet guide to guide the sheet to the registration roller, disposed between the feed roller and the registration roller in a sheet conveyance path through which the sheet is transported;

a support member to movably support the movable sheet guide relative to an apparatus body in which the sheet feeder is disposed; and a bias member to bias the movable sheet guide toward the sheet, wherein, as a degree of tension of the sheet increases, the movable sheet guide wraps more of the sheet around the registration roller by moving against a bias force exerted by the bias member.

2. The sheet feeder according to claim 1, wherein the movable sheet guide guides the sheet to the registration roller in a direction tangential to the registration roller.

3. The sheet feeder according to claim 1, wherein the movable sheet guide rotates coaxially with the registration roller.

4. The sheet feeder according to claim 1, further comprising:

a feed motor to drive the feed roller; and a registration motor to drive the registration roller, wherein the feed motor is started up gradually and the registration motor is started up rapidly.

5. The sheet feeder according to claim 4, wherein the feed motor is a low-velocity motor and the registration motor is a high-velocity motor.

6. An image forming apparatus comprising:

an ink-ejecting device to eject ink droplets onto sheets of recording media; and a sheet feeder to feed the sheet to an area facing the ink-ejecting device, the sheet feeder comprising:

a feed roller to unreel the sheet from a roll;

a registration roller to transport the sheet unreeled by the feed roller to the image forming unit;

a movable sheet guide to guide the sheet to the registration roller, disposed between the feed roller and the registration roller in a sheet conveyance path through which the sheet is transported;

a support member to movably support the movable sheet guide relative to a body of the image forming apparatus; and a bias member to bias the movable sheet guide toward the sheet, wherein, as a degree of tension of the sheet increases, the movable sheet guide wraps more of the sheet around the registration roller by moving against a bias force exerted by the bias member.

7. The image forming apparatus according to claim 6, wherein the feed roller and the registration roller are driven intermittently.

8. An image forming apparatus comprising:

an image carrier;

a toner image forming unit to form a toner image on the image carrier;

a transfer device to transfer the toner image from the image carrier onto a sheet of recording media in a transfer area where the image carrier faces the sheet uses; and a sheet feeder to feed the sheet to the transfer area, the sheet feeder comprising:

a feed roller to unreel the sheet from a roll;

a registration roller to transport the sheet unreeled by the feed roller to the image forming unit;

a movable sheet guide to guide the sheet to the registration roller, disposed between the feed roller and the registration roller in a sheet conveyance path through which the sheet is transported;

a support member to movably support the movable sheet guide relative to a body of the image forming apparatus; and a bias member to bias the movable sheet guide toward the sheet, wherein, as a degree of tension of the sheet increases, the movable sheet guide wraps more of the sheet around the registration roller by moving against a bias force exerted by the bias member.

* * * * *